US009551306B2

(12) United States Patent
Kinsey, Jr.

(10) Patent No.: US 9,551,306 B2
(45) Date of Patent: Jan. 24, 2017

(54) AIR FILTRATION ELEMENT

(71) Applicant: Caterpillar Inc., Peoria, IL (US)

(72) Inventor: Bobby J. Kinsey, Jr., Washington, IL (US)

(73) Assignee: Caterpillar Inc., Peoria, IL (US)

(*) Notice: Subject to any disclaimer, the term of this patent is extended or adjusted under 35 U.S.C. 154(b) by 126 days.

(21) Appl. No.: 14/326,753

(22) Filed: Jul. 9, 2014

(65) Prior Publication Data

US 2016/0010601 A1 Jan. 14, 2016

(51) Int. Cl.
*F02M 35/024* (2006.01)
*B01D 46/00* (2006.01)
*B01D 46/12* (2006.01)
*B01D 46/52* (2006.01)
*B01D 46/24* (2006.01)

(52) U.S. Cl.
CPC .... *F02M 35/02483* (2013.01); *B01D 46/0001* (2013.01); *B01D 46/0021* (2013.01); *B01D 46/12* (2013.01); *B01D 46/2411* (2013.01); *B01D 46/526* (2013.01); *F02M 35/02408* (2013.01); *F02M 35/02416* (2013.01); *F02M 35/02433* (2013.01); *B01D 2275/206* (2013.01)

(58) Field of Classification Search
CPC ............... F02M 35/02483; F02M 35/02416; F02M 35/02408; B01D 46/0001; B01D 46/526; B01D 46/12; B01D 46/2411; B01D 46/0021; B01D 2275/206
See application file for complete search history.

(56) References Cited

U.S. PATENT DOCUMENTS

| | | | | |
|---|---|---|---|---|
| 2,771,153 A | * | 11/1956 | Hennig | B01D 46/002 55/350.1 |
| 3,369,668 A | * | 2/1968 | Glos, II | B01D 39/083 210/345 |
| 3,385,573 A | * | 5/1968 | Gilman | B01D 46/0021 261/24 |
| 3,485,376 A | * | 12/1969 | Peterson | B01D 33/23 210/331 |
| 3,643,803 A | * | 2/1972 | Glos, II | B01D 33/23 210/232 |
| 3,800,510 A | * | 4/1974 | Lamond | B01D 46/0012 55/497 |
| 3,948,779 A | * | 4/1976 | Jackson | B01D 33/23 210/331 |

(Continued)

FOREIGN PATENT DOCUMENTS

| DE | 102005050273 | 4/2007 |
|---|---|---|
| EP | 2292311 | 3/2011 |

(Continued)

*Primary Examiner* — Amber R Orlando
*Assistant Examiner* — Britanny Precht

(57) ABSTRACT

A segmented air filtration element is provided. The segmented air filtration element includes a center tube defining a central axis and an inner passage therein. The center tube includes a plurality of ribs extending along the central axis and spaced apart from one another. A plurality of segmenting surfaces is attached to the center tube in a radial arrangement with respect to the central axis. The plurality of segmenting surfaces is configured to accommodate a plurality of filter media therebetween such that each of the plurality of filter media is selectively replaceable therefrom.

16 Claims, 9 Drawing Sheets

(56) References Cited

U.S. PATENT DOCUMENTS

| | | | | |
|---|---|---|---|---|
| 4,139,472 A | * | 2/1979 | Simonson | B01D 33/23 210/232 |
| 4,162,982 A | * | 7/1979 | Chesner | B01D 33/23 210/331 |
| 4,243,535 A | | 1/1981 | Behrends et al. | |
| 4,330,405 A | * | 5/1982 | Davis | B01D 33/23 210/331 |
| 4,343,631 A | * | 8/1982 | Ciliberti | B01D 46/002 55/302 |
| 4,481,021 A | * | 11/1984 | Kinney, Jr. | B01D 46/26 210/402 |
| 4,640,779 A | * | 2/1987 | Taki | B01D 27/06 210/493.5 |
| 4,801,382 A | * | 1/1989 | Kemmelmeyer | B01D 25/26 210/323.1 |
| 4,876,007 A | * | 10/1989 | Naruo | B01D 63/084 210/339 |
| 5,250,094 A | * | 10/1993 | Chung | B01D 39/202 55/523 |
| 5,531,892 A | * | 7/1996 | Duffy | B01D 29/012 210/493.1 |
| 5,647,982 A | * | 7/1997 | Haythornthwaite | B01D 33/23 210/346 |
| 5,833,725 A | * | 11/1998 | Dehn | B01D 46/0068 55/302 |
| 5,858,039 A | * | 1/1999 | Schumann | B01D 46/08 55/378 |
| 5,958,096 A | * | 9/1999 | Yee | B01D 46/0002 55/385.3 |
| 6,099,609 A | * | 8/2000 | Lira | B01D 46/26 55/400 |
| 6,231,761 B1 | * | 5/2001 | Mohlin | B01D 33/23 210/232 |
| 6,510,948 B1 | | 1/2003 | Barnett | |
| 6,761,821 B2 | * | 7/2004 | Appel | B04B 3/00 127/19 |
| 7,967,886 B2 | | 6/2011 | Schrage et al. | |
| 7,972,402 B2 | | 7/2011 | Babb | |
| 8,061,529 B2 | * | 11/2011 | Marheine | B01D 29/072 210/167.01 |
| 8,118,175 B2 | * | 2/2012 | Davis | B01D 33/0093 210/321.77 |
| 8,172,920 B2 | | 5/2012 | Merritt | |
| 8,518,141 B2 | | 8/2013 | Schrage et al. | |
| 8,545,589 B2 | | 10/2013 | Rocklitz et al. | |
| 8,591,622 B2 | | 11/2013 | Gallagher et al. | |
| 8,801,929 B2 | * | 8/2014 | Davis | B01D 33/0093 210/331 |
| 8,864,991 B2 | * | 10/2014 | Larsson | B01D 33/23 210/331 |
| 9,221,003 B2 | * | 12/2015 | Schumann | B01D 46/06 |
| 2004/0128988 A1 | * | 7/2004 | Frankle | B01D 39/12 60/297 |
| 2004/0173520 A1 | * | 9/2004 | Nguyen | B01D 27/06 210/440 |
| 2005/0252845 A1 | * | 11/2005 | Kemmelmeyer | B01D 25/26 210/323.1 |
| 2007/0157808 A1 | * | 7/2007 | Wagner | B01D 29/52 95/273 |
| 2009/0020483 A1 | * | 1/2009 | Davis | B01D 33/0093 210/784 |
| 2009/0026124 A1 | * | 1/2009 | Schmitz | B01D 29/46 210/231 |
| 2009/0057221 A1 | * | 3/2009 | Bridges | B01D 29/111 210/445 |
| 2011/0006018 A1 | * | 1/2011 | Ben-Horin | B01D 29/35 210/806 |
| 2011/0024347 A1 | * | 2/2011 | Larsson | B01D 33/23 210/331 |
| 2011/0186504 A1 | | 8/2011 | Rocklitz | |
| 2012/0102902 A1 | * | 5/2012 | Gallagher | B01D 46/0021 55/484 |

FOREIGN PATENT DOCUMENTS

| | | |
|---|---|---|
| EP | 2732863 | 5/2014 |
| WO | 2006113388 | 10/2006 |

\* cited by examiner

AIR FILTRATION ELEMENT

TECHNICAL FIELD

The present disclosure relates to an air filtration element, and more specifically to the air filtration element for use in filtering fluids, such as air.

BACKGROUND

Air flow in an engine system may contain entrained particulate material therein. This particulate material if not removed, may cause substantial damage to components of the engine system. An air filtration assembly may be provided in association with the engine system to remove the particulate material from the air flow upstream of the components of the engine system. A variety of the air filtration assemblies are known for removal of the particulate material from the air flow. For example, a z-filter media construction including fluted media sheets may be utilized with the engine system. Based on usage, these air filtration assemblies may need periodic servicing or replacement. Frequent replacement of the air filtration assembly may affect an overall operating cost of the system.

U.S. Pat. No. 8,591,622 describes a filter apparatus having a filter stack including a plurality of porous ceramic plates that are axially spaced from one another to define a plurality of axially spaced apart radial flow areas. The filter stack is mounted within a housing. The plurality of porous ceramic plates alternate between a first set of porous ceramic plates that are nested with a second set of porous ceramic plates. At least one of the sides of the porous ceramic plates defines a plurality of radial flutes arranged in a radial array.

SUMMARY OF THE DISCLOSURE

In one aspect of the present disclosure, a segmented air filtration element is provided. The segmented air filtration element includes a center tube defining a central axis and an inner passage therein. The center tube includes a plurality of ribs extending along the central axis and spaced apart from one another. A plurality of segmenting surfaces is attached to the center tube in a radial arrangement with respect to the central axis. The plurality of segmenting surfaces is configured to accommodate a plurality of filter media therebetween such that each of the plurality of filter media is selectively replaceable therefrom.

In another aspect of the present disclosure, a segmented air filtration element is provided. The segmented air filtration element includes a center tube defining a central axis and an inner passage therein. The center tube comprises a first end surface, a second end surface, and a plurality of ribs extending along the central axis and spaced apart from one another. The plurality of ribs is connected between the first end surface and the second end surface. Each of the plurality of ribs includes a ramped channel thereon provided on an exterior facing surface of the respective rib. A plurality of segmenting surfaces is attached to the center tube in a radial arrangement with respect to the central axis. Each of the plurality of segmenting surfaces having an edge engaged within the ramped channel of the respective rib. A plurality of filter media is attached between each of the plurality of segmenting surfaces in a radially stacked arrangement with respect to the central axis. Each of the plurality of filter media are selectively replaceable therefrom, such that each of the plurality of filter media has a narrow end surface communicating with the inner passage and a broad top surface.

In yet another aspect of the present disclosure, a method for assembling a segmented air filtration element is provided. The method includes providing a center tube defining a central axis and an inner passage therein. The center tube includes a plurality of ribs extending along the central axis and spaced apart from one another. The method includes attaching a plurality of segmenting surfaces to the center tube in a radial arrangement with respect to the central axis. The method includes attaching, removably, a plurality of filter media between the plurality of segmenting surfaces and in communication with the inner passage.

Other features and aspects of this disclosure will be apparent from the following description and the accompanying drawings.

DETAILED DESCRIPTION

Figure 1:
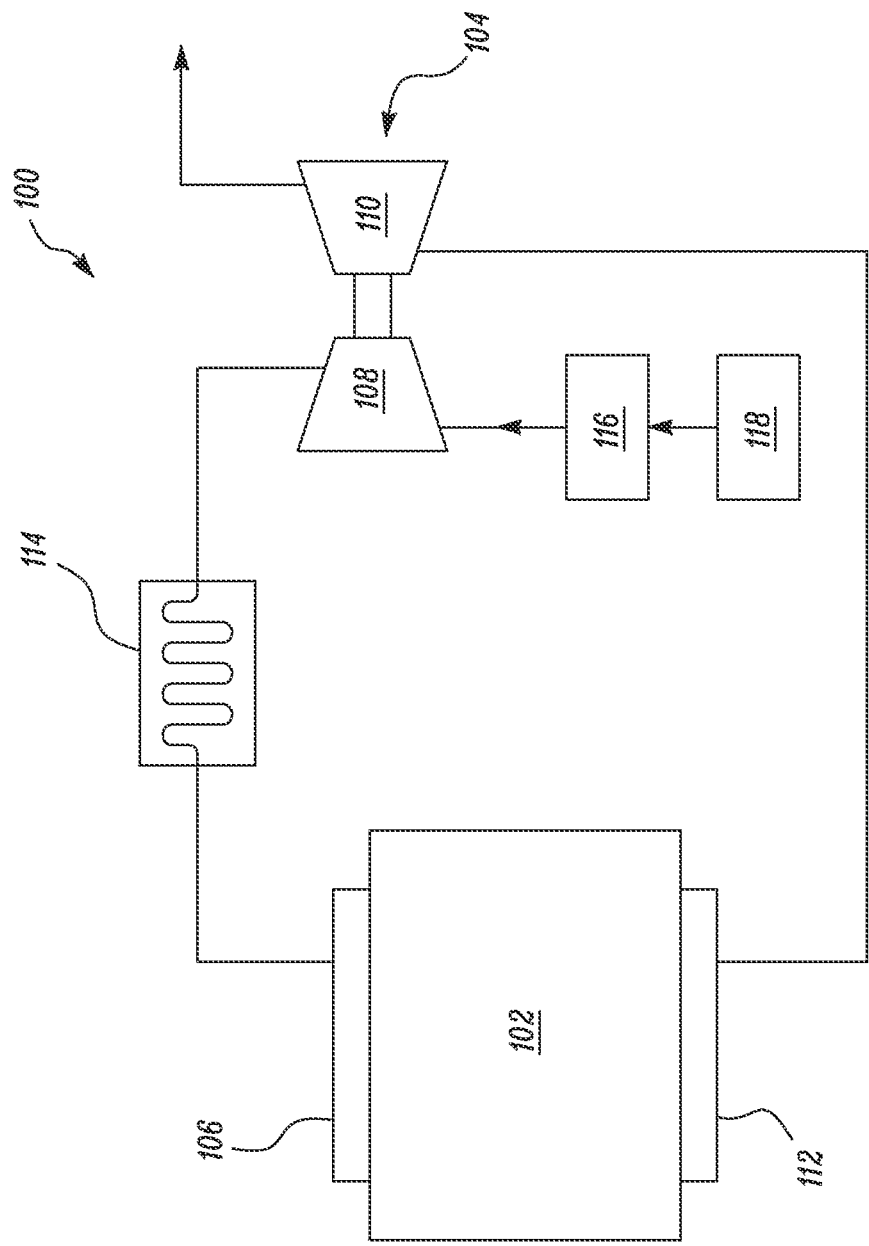
FIG. 1 is a schematic of an exemplary engine system, according to one embodiment of the present disclosure.

Wherever possible, the same reference numbers will be used throughout the drawings to refer to the same or the like parts. Referring to FIG. 1, an exemplary engine system 100 is illustrated. The engine system 100 includes an engine 102. The engine 102 is embodied as an internal combustion engine powered by diesel fuel. In other embodiments, the engine 102 may be powered by any other fuel such as, gasoline, natural gas, a combination thereof and so on. Further, the engine 102 may be a gas turbine engine.

The engine system 100 includes a turbocharger 104 provided in fluid communication with the engine 102. The turbocharger 104 is provided upstream of the engine 102 with respect to a flow direction of intake air. Further, the turbocharger 104 is provided in fluid communication with an intake manifold 106 associated with the engine 102. The turbocharger 104 includes a compressor 108 drivably coupled to a turbine 110. The turbine 110 is driven by exhaust gas exiting from an exhaust manifold 112 associated with the engine 102 which in turn drives the compressor 108. The compressor 108 is configured to compress and increase a density of the intake air before being supplied to the intake manifold 106.

Further, the engine system 100 also includes an aftercooler 114, provided downstream of the turbocharger 104. The aftercooler 114 is provided in fluid communication with the compressor 108 and the intake manifold 106. The aftercooler 114 is configured to reduce a temperature of the intake air downstream of the compressor 108 before being supplied to the intake manifold 106. Alternatively, an intercooler (not shown) may be provided within the turbocharger 104, and more specifically, between consecutive stages of compression of the intake air.

The engine system 100 further includes a segmented air filtration element, hereinafter referred to as air filtration element 116, in fluid communication with the compressor 108. Further, the air filtration element 116 is in fluid communication with an air source 118. The air filtration element 116 may receive airflow from the air source 118. In one example, the airflow may be atmospheric air. The air filtration element 116 is configured to filter the airflow passing therethrough and entering into the compressor 108. The air filtration element 116 may separate out abrasive particles, debris or any other particulate contaminants from the airflow. The construction and working of the air filtration element 116 will now be described in detail with reference to the subsequent figures.

Figure 2:
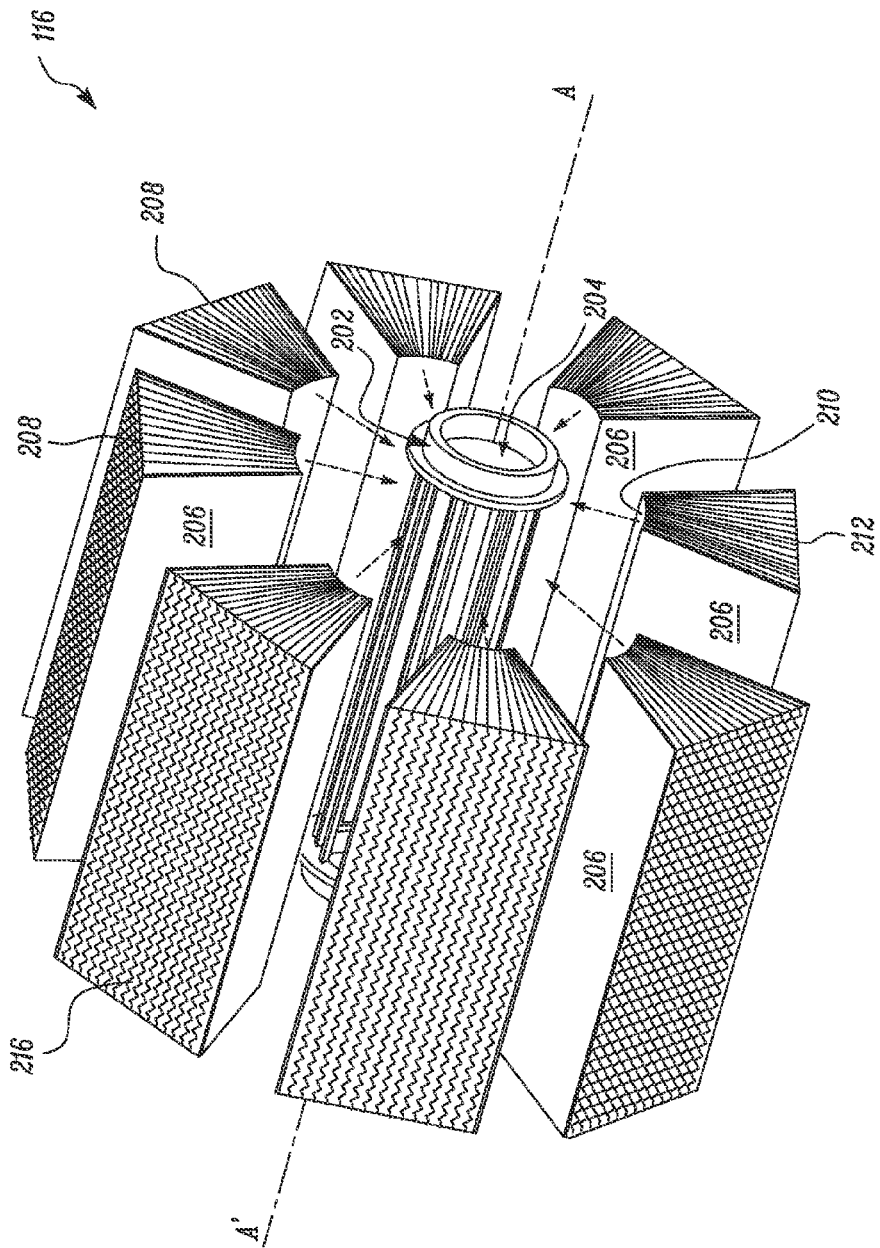
FIG. 2 is an exploded view of an air filtration element, according to one embodiment of the present disclosure.
Figure 3:
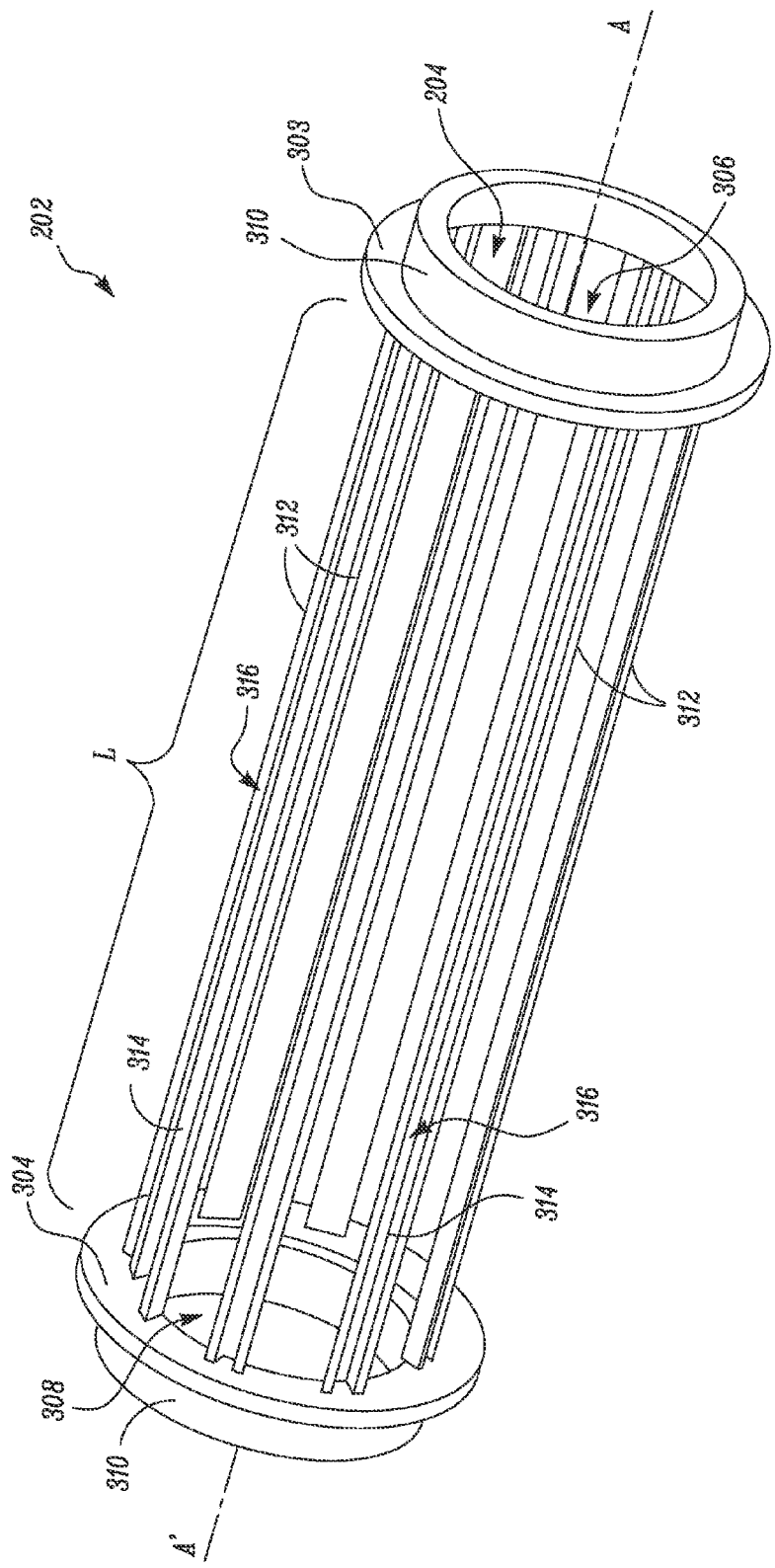
FIG. 3 is a perspective view of a center tube of the air filtration element, according to one embodiment of the present disclosure.

Referring to FIGS. 2 and 3, the air filtration element 116 includes a center tube 202 defining a central axis A-A'. The center tube 202 may have a hollow configuration, such that an inner passage 204 formed within the center tube 202 is in fluid communication with the compressor 108. Further, the center tube 202 may have a cylindrical shape. As shown in FIG. 3, the center tube 202 includes a first end surface 303 and a second end surface 304, defining a length "L" of the center tube 202 therebetween. The first end surface 303 and the second end surface 304 may have a ring-like configuration that define openings 306, 308 communicating with the inner passage 204 respectively. In one embodiment, a flange 310 projects axially from the first end surface 303. Additionally or optionally, the flange 310 may project from the second end surface 304.

The center tube 202 includes a plurality of ribs 312 extending along the length "L" of the center tube 202. The ribs 312 connect the first and second end surfaces 303, 304 to each other. The ribs 312 are spaced apart from each other, such that at least two ribs 312 are provided. In the illustrated embodiment, eight ribs 312 are provided in a spaced apart arrangement. The number of ribs 312 may vary based on the application. A ramped channel 314 is also provided on an exterior facing surface 316 of each of the respective ribs 312. The ramped channel 314 is provided along an entire length of the respective rib 312. Alternatively, the ramped channel 314 may be provided along a portion of the length of the ribs 312.

Figure 4:
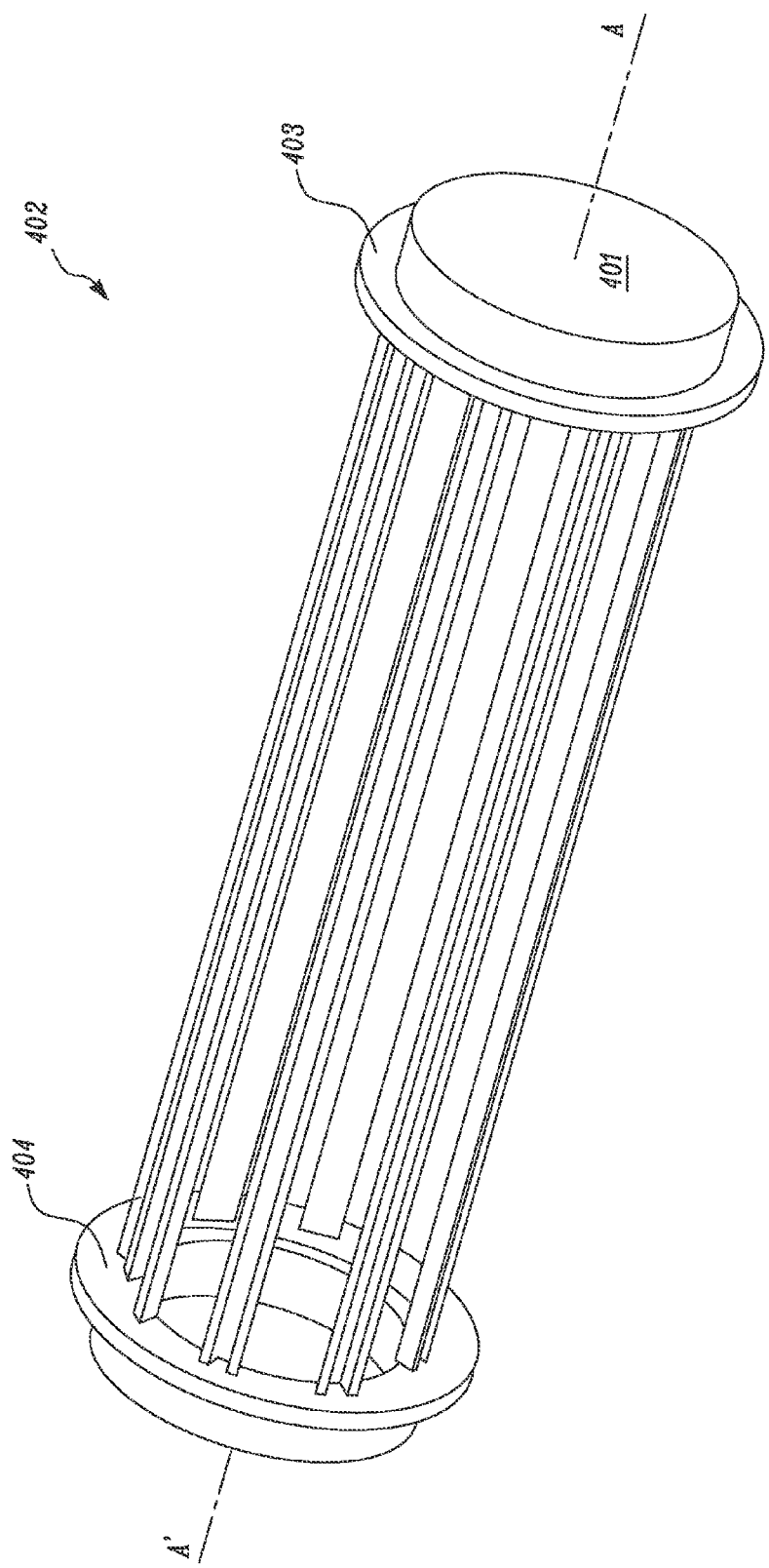
FIG. 4 is a perspective view of the center tube, according to another embodiment of the present disclosure.
Figure 5:
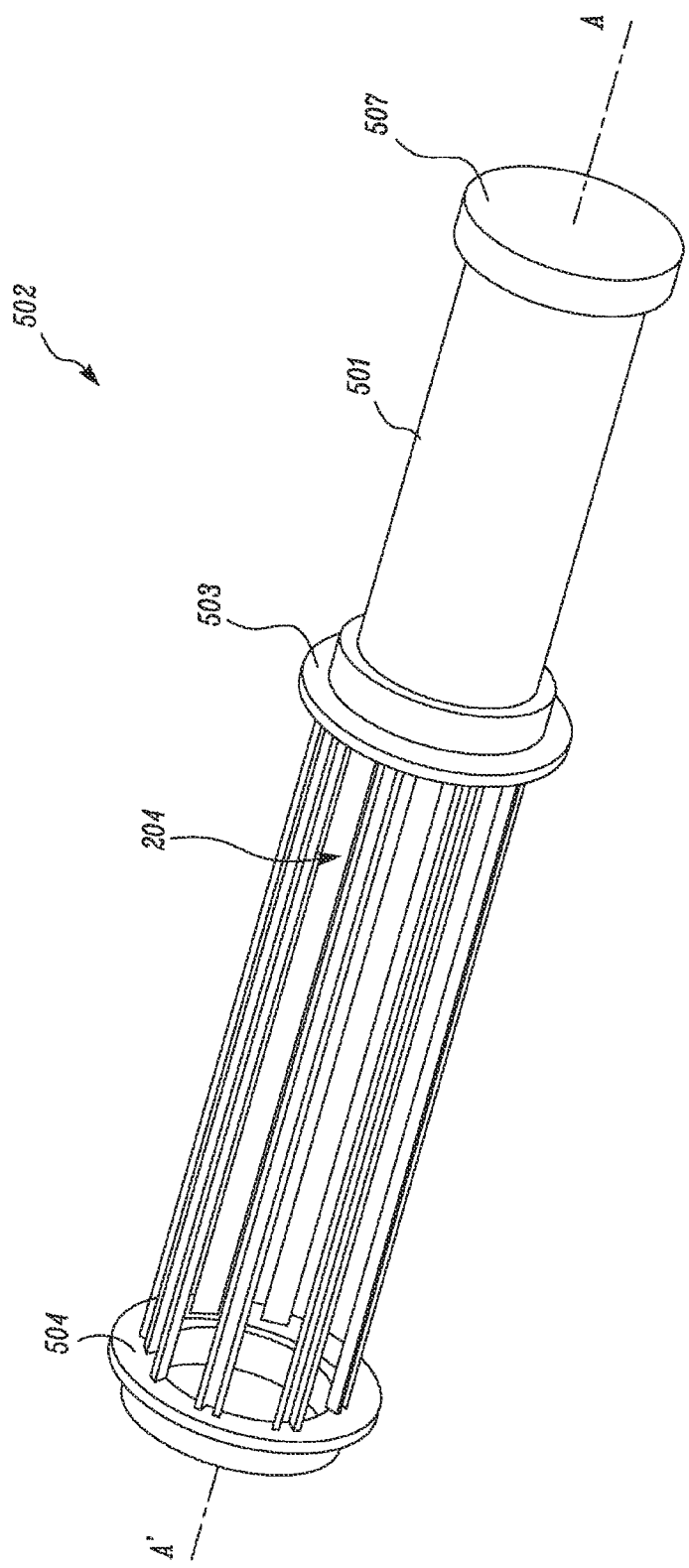
FIG. 5 is a perspective view of the center tube, according to yet another embodiment of the present disclosure.

Other embodiments of the center tube 402, 502 are illustrated in FIGS. 4 and 5 respectively. Referring to FIG. 4, the first end surface 403 has a closed configuration, such that an end cap 401 is provided thereon. The end cap 401 may be integral with the first end surface 403. Alternatively, the end cap 401 may be a separate unit and attached to the first end surface 403 by known mechanical fastening means. By providing the end cap 401 the airflow may be directed through the second end surface 404. The second end surface 404 may serve as an outlet of the air filtration element 116 that is in fluid communication with the compressor 108. In an alternate embodiment, when the first end surface 403 is in fluid communication with the compressor 108, the end cap 401 may be provided at the second end surface 404.

Referring to FIG. 5, yet another embodiment of the center tube 502 is illustrated. As shown, a cylindrical member 501 is slidably received into the inner passage 204. A length of the cylindrical member 501 may vary based on the application. The cylindrical member 501 has one closed end 507, such that based on a movement of the cylindrical member 501 within the center tube 502, the first end surface 503 is closed by the closed end 507 in order to direct the airflow through the second end surface 504 towards the compressor 108. Accordingly, a diameter of the cylindrical member 501 is lesser than a diameter of the first or second end surfaces 503, 504 to provide clearance therebetween during the movement. Alternatively, when the first end surface 503 is in fluid communication with the compressor 108, the cylindrical member 501 is received at the second end surface 504.

Figure 6:
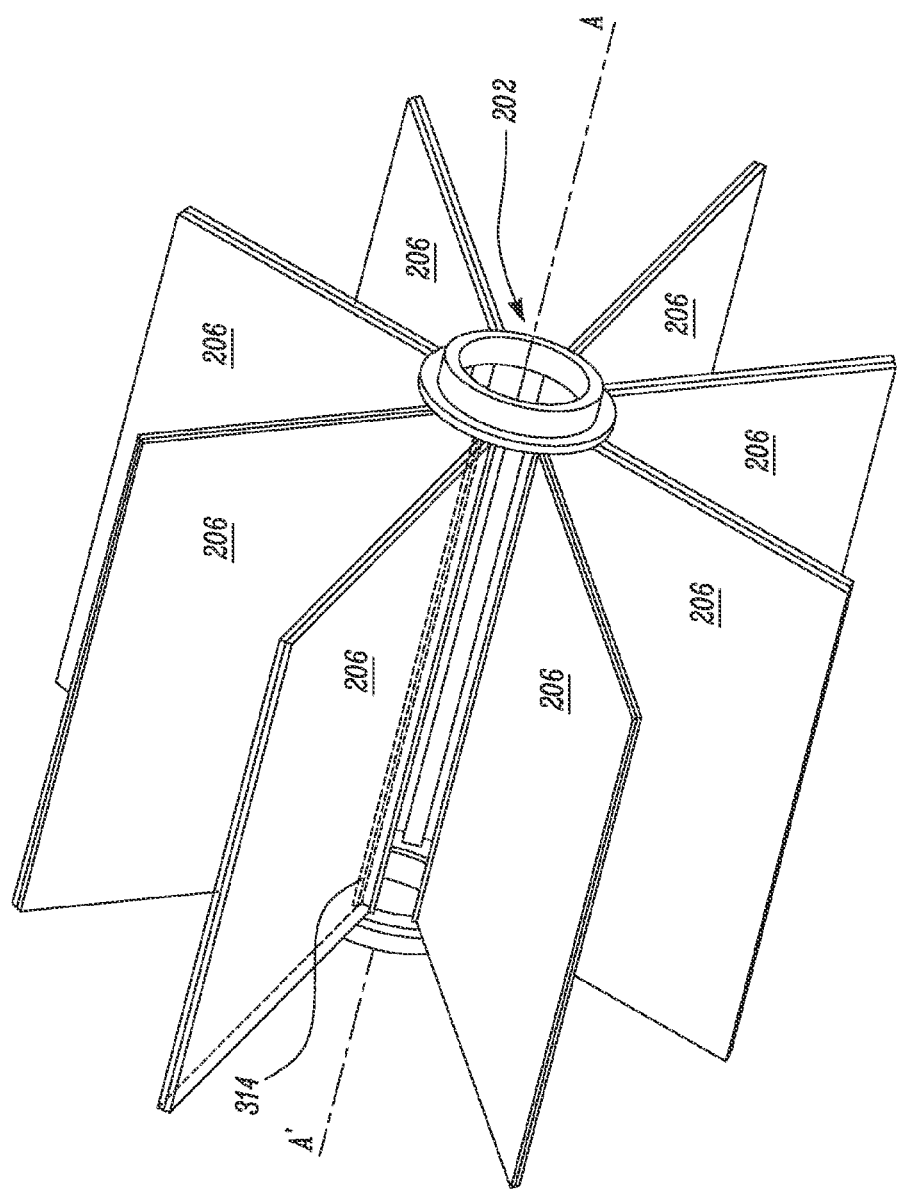
FIG. 6 is a perspective view of the center tube and the segmenting surfaces of the air filtration element, according to one embodiment of the present disclosure.

A number of segmenting surfaces 206 is engaged within the ramped channel 314 of the respective rib 312 (as shown in dashed lines in FIG. 6). Referring to FIGS. 2 and 6, the segmenting surfaces 206 may have a planar configuration. The segmenting surfaces 206 may be attached to the ribs 312 in a variety of ways. For example, the segmenting surfaces 206 may be securely held within the ramped channel 314 using an adhesive. In another example, a thickness of the segmenting surfaces 206 may be so chosen in order to press fit within the ramped channel 314. The segmenting surfaces 206 are arranged in a radial manner with respect to the central axis A-A'.

In the accompanying figures, sixteen segmenting surfaces 206 are shown extending radially with respect to the central axis A-A' of the center tube 202, such that two segmenting surfaces 206 are engaged within each ramped channel 314. In another embodiment, eight segmenting surfaces 206 may be provided such that a single segmenting surface 206 is engaged within the ramped channel 314. A person of ordinary skill in the art will appreciate that dimensions of the segmenting surfaces 206, for example, thickness, width, length, and number of the segmenting surfaces 206 may vary based on the application without any limitation.

Figure 7:
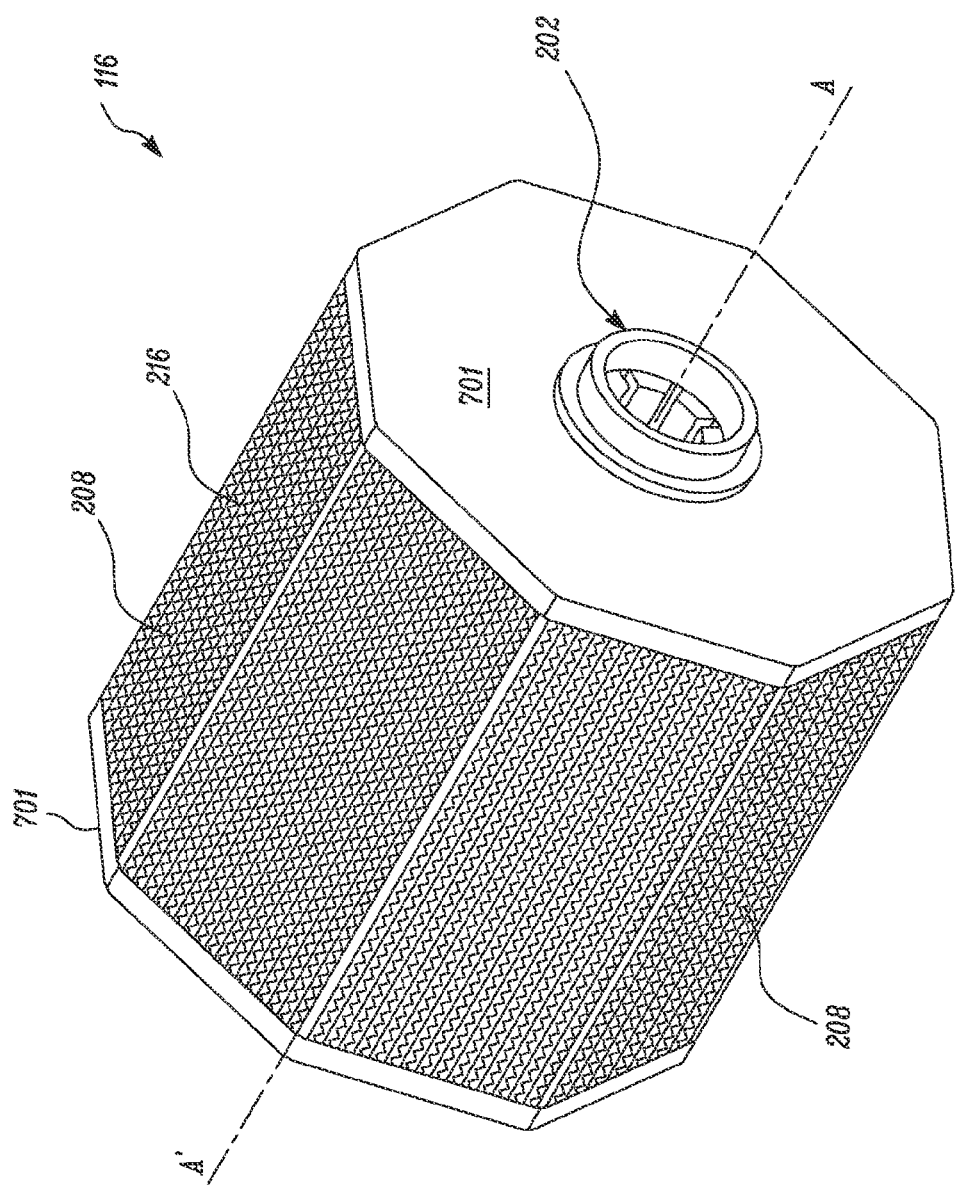
FIG. 7 is a perspective view of the air filtration element, according to one embodiment of the present disclosure.
Figure 8:
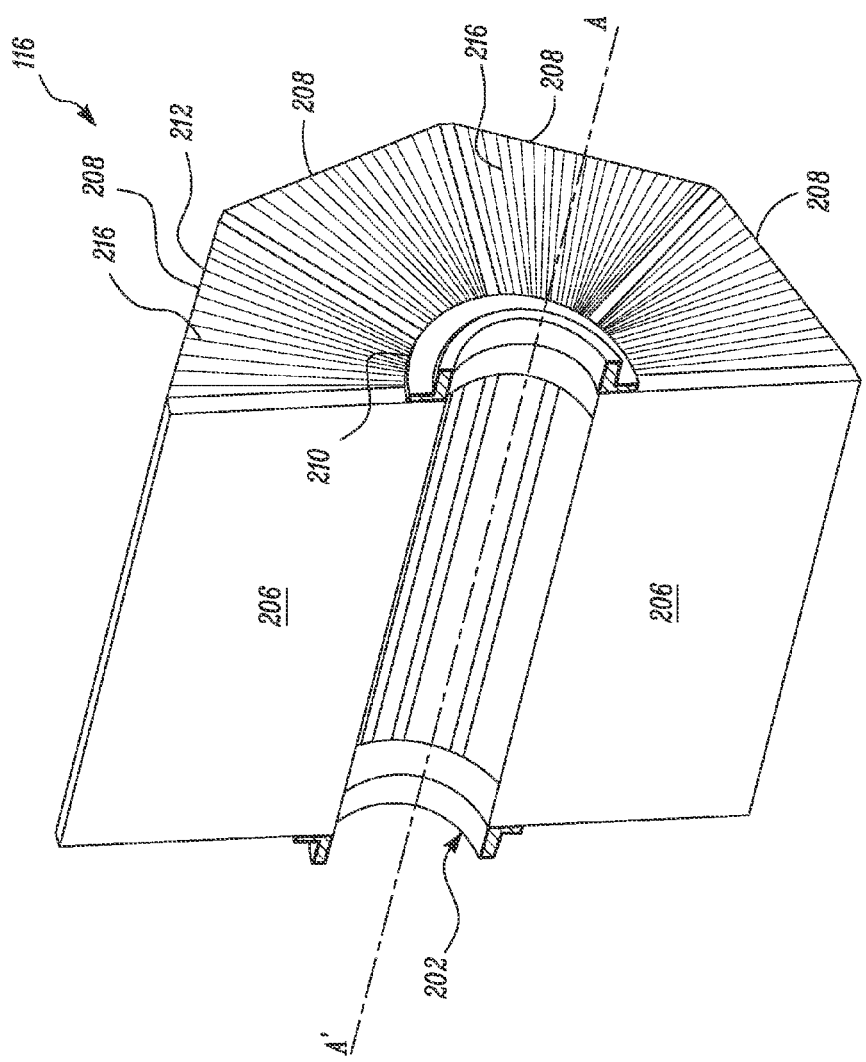
FIG. 8 is a cross sectional view of the air filtration element, according to one embodiment of the present disclosure.
Figure 9:
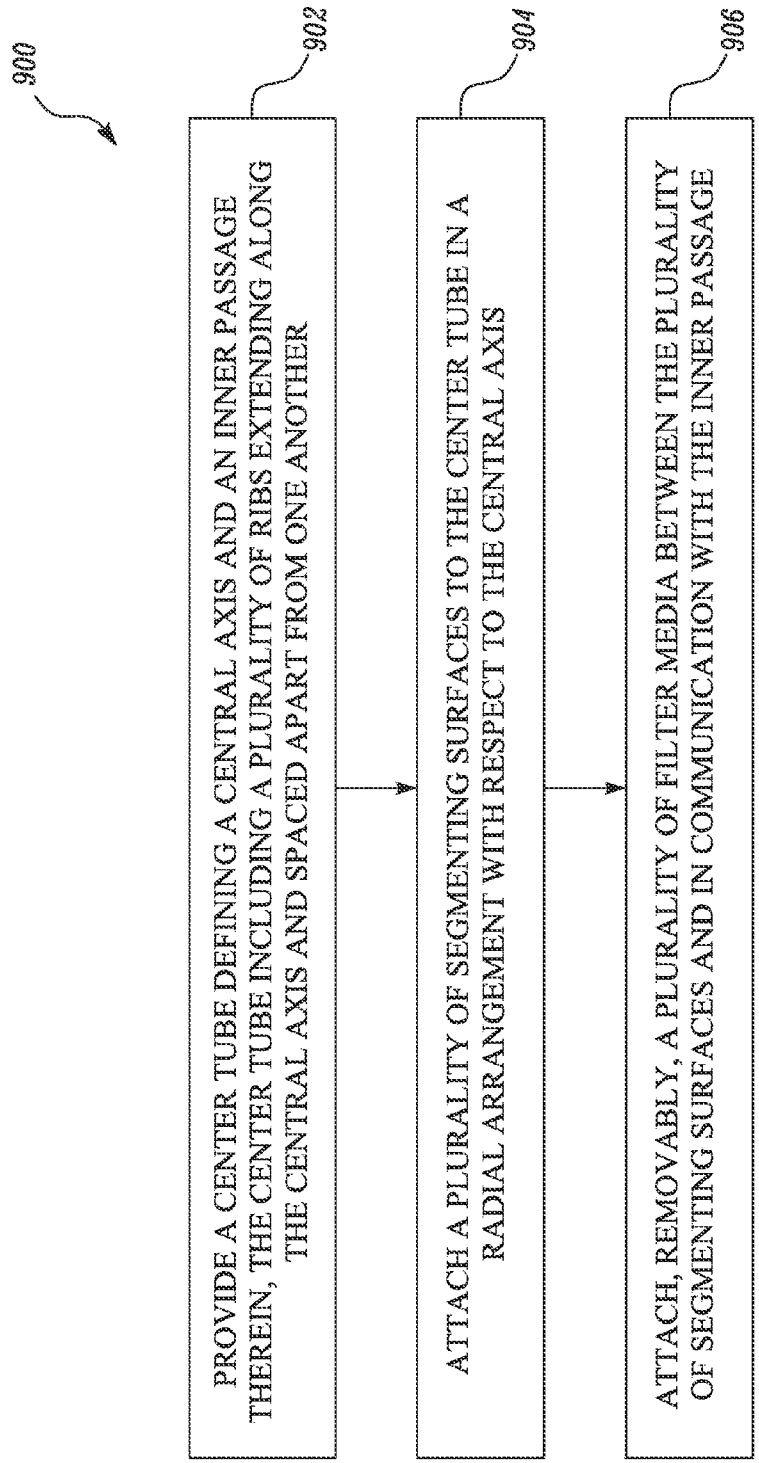
FIG. 9 is a method for assembling the air filtration element, according to one embodiment of the present disclosure.

FIG. 7 is a perspective view of the air filtration element 116 and FIG. 8 is a sectional view of the air filtration element 116. A plurality of filter media 208 (as shown in FIGS. 2, 7 and 8), is attached between respective adjacent segmenting surfaces 206. The filter media 208 may have a wedge shape. In one embodiment, the wedge may subtend an angle of approximately between 30° to 45° with respect to the central axis A-A' of the center tube 202. The filter media 208 may be arranged in such a manner that a narrow end surface 210 thereof is in fluid communication with the inner passage 204. The narrow end surface 210 may have a curved or arcuate shape such that the respective filter media 208 may contact with the center tube 202 when assembled (see FIG. 8). A broad end surface 212 of each of the filter media 208 may have a flat configuration. Accordingly, as shown in the accompanying figures, a cross section of the air filtration element 116 may have an octagonal configuration (see FIG. 7). Alternatively, the air filtration element 116 may have a circular cross section. In other embodiments, the cross section of the air filtration element 116 may vary based on the number of segmenting surfaces 206 present in the air filtration element 116.

Each of the filter media 208 along with the respective segmenting surfaces 206 positioned on either side of the filter media 208 is removably attached to the center tube 202 of the air filtration element 116. In one embodiment, the filter media 208 may have an attachment face on either side thereof, for removably attaching the respective filter media 208 between the adjacent segmenting surfaces 206 in the embodiment wherein eight segmenting surfaces 206 are provided. Each of the filter media 208 is coupled between a pair of the segmenting surfaces 206 on either side of the respective filter media 208 by a variety of techniques known in the art, for example, by using an adhesive. The plurality of filter media 208 is attached to the air filtration element 116 in such a manner that each of the filter media 208 may be individually replaceable therefrom. Further, each of the filter media 208 may be embodied as a fluted media pack known in the art. The fluted media pack may include a number of flutes 216 or corrugated sheets arranged within each filter media 208 such that the flutes 216 are provided in a radial arrangement with respect to the central axis A-A'.

Referring to FIGS. 3 and 7, a backing plate 701 is attached to the first and second end surfaces 303, 304 of the air filtration element 116. In another embodiment, the backing plate 701 may be attached to the first end surface 303 or the second end surface 304. The backing plate 701 may have a flat planar configuration having an octagonal shape. Alternatively, the shape and dimensions of the backing plate 701 may vary in order to conform to the cross section of the air filtration element 116.

The air filtration element components, such as the center tube 202, 402, 502, the segmenting surfaces 206 and the backing plate 701 may be made from a metal or polymer. A person of ordinary skill in the art will appreciate that the air filtration element 116 design described herein is exemplary and does not limit the scope of the present disclosure.

INDUSTRIAL APPLICABILITY

The present disclosure relates to the air filtration element 116 that may have an improved service life. By allowing for the replacement of distinct portions of the individual filter media 208, the overall life of the air filtration element 116 may be extended. In one example, the life of the air filtration element 116 may be doubled. Further, the air filtration element 116 may be installed with ease in current engine system designs.

A method 900 for assembling the air filtration element 116 will now be described in detail. At step 902, the center tube 202, 402, 502 of the air filtration element 116 is provided. The ribs 312 of the center tube 202, 402, 502 are disposed in a spaced apart arrangement from each other as described above.

At step 904, the plurality of segmenting surfaces 206 is attached to the center tube 202, 402, 502. At step 906, the filter media 208 are removably attached between the segmenting surfaces 206. The airflow containing the particulate contaminants suspended therein may be incident on the broad end surface 212 of the filter media 208. In one embodiment, the flutes 216 present within the filter media 208 may be sealed on opposite ends, causing the airflow to pass through the filter media 208, thereby causing the particulate contaminants to be filtered out from the airflow. The filtered airflow may contain minimal or no particulate contaminants therein. The filtered airflow may exit through an open end of the flutes 216 positioned at the narrow end surface 210 of the filter media 208 and enter into the inner passage 204 of the center tube 202. Further, the filtered airflow may flow into the compressor 108 present downstream of the air filtration element 116.

Whenever required, any one or more of the filter media 208 may be removed and replaced with new filter media based on usage of the air filtration element 116. Removal of individual segments of the filter media 208 may allow for easy servicing of the air filtration element 116 and may improve the life thereof.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A segmented air filtration element comprising:
a center tube defining a central axis and an inner passage therein, the center tube including a plurality of ribs extending along the central axis and spaced apart from one another, each of the plurality of ribs including a ramped channel on an exterior facing surface of the respective rib; and
a plurality of segmenting surfaces attached to the center tube in a radial arrangement with respect to the central axis, each of the segmenting surfaces being received within one of the ramped channels on one of the plurality of ribs,
wherein the plurality of segmenting surfaces are configured to accommodate a plurality of wedge shaped filter media therebetween such that each of the plurality of filter media is selectively replaceable therefrom.

2. The segmented air filtration element of claim 1, wherein a count of the plurality of ribs is eight in number.

3. The segmented air filtration element of claim 1, wherein the center tube has at least one open end communicating with the inner passage.

4. The segmented air filtration element of claim 1 further comprising a backing plate attached to at least one end of the center tube.

5. The segmented air filtration element of claim 1 further comprising a cylindrical member slidably received into the center tube.

6. The segmented air filtration element of claim 1, wherein each of the plurality of segmenting surfaces has a planar configuration.

7. A segmented air filtration element comprising:
a center tube defining a central axis and an inner passage therein, the center tube comprising:
a first end surface;
a second end surface; and
a plurality of ribs extending along the central axis and spaced apart from one another, the plurality of ribs connected between the first end surface and the second end surface, each of the plurality of ribs including a ramped channel thereon provided on an exterior facing surface of the respective rib;
a plurality of segmenting surfaces attached to the center tube in a radial arrangement with respect to the central axis, each of the plurality of segmenting surfaces having an edge engaged within the ramped channel of the respective rib; and
a plurality of wedge shaped filter media attached between each of the plurality of segmenting surfaces in a radially stacked arrangement with respect to the central axis, each of the plurality of filter media being selectively replaceable therefrom, wherein each of the plurality of filter media has a narrow end surface communicating with the inner passage and a broad top surface.

8. The segmented air filtration element of claim 7 further comprising a flange projecting axially from at least one of an exterior facing surface of the first end surface and the second end surface respectively.

9. The segmented air filtration element of claim 7 wherein each of the first end surface and the second end surface have a ringed configuration defining an opening communicating with the inner passage.

10. The segmented air filtration element of claim 9 further comprising a cylindrical member slidably received into the inner passage, the cylindrical member configured to close the opening of any one of the first end surface and the second end surface respectively.

11. The segmented air filtration element of claim 7, wherein the narrow end surface has an arcuate configuration and the broad end surface has a flat configuration.

12. The segmented air filtration element of claim 7, wherein the segmented air filtration element has an octagonal cross section.

13. The segmented air filtration element of claim 7, wherein any one of the first end surface and the second end surface has a closed configuration.

14. The segmented air filtration element of claim 7 further comprising a backing plate attached to at least one of the first end surface and the second end surface.

15. The segmented air filtration element of claim 7, wherein each of the plurality of segmenting surfaces has a planar configuration.

16. The segmented air filtration element of claim 7, wherein each of the plurality of filter media is a fluted media pack.

* * * * *